UNITED STATES PATENT OFFICE.

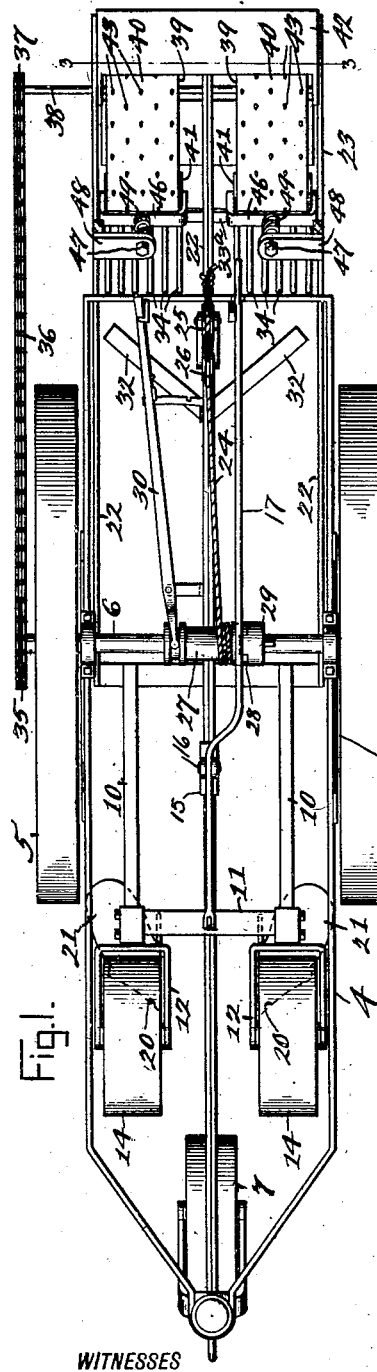

CLARENCE J. HOBSON AND GEORGE PAGE WRIGHT, OF ORBY, CALIFORNIA.

BEET-HARVESTER.

1,213,371.

Specification of Letters Patent.

Patented Jan. 23, 1917.

Application filed May 27, 1915. Serial No. 30,865.

*To all whom it may concern:*

Be it known that we, CLARENCE J. HOBSON and GEORGE P. WRIGHT, citizens of the United States, and residents of Orby, in the county of Santa Barbara, in the State of California, have invented certain new and useful Improvements in Beet-Harvesters, of which the following is a specification.

Our invention relates to harvesters, with a particular reference to beet harvesters, and the main object thereof is to provide such a machine which tops, pulls, and piles beets from two or more rows at a time.

Our invention is fully described in the following specification, of which the accompanying drawings form a part, in which like characters refer to like parts in each of the views, and in which:—

Figure 1 is a top plan view of a beet harvester constructed in accordance with our present invention; Fig. 2 is a side elevation thereof; and Fig. 3 is a section taken on the line 3—3 of Fig. 1.

In the drawings forming a part of this application we have shown a present preferred embodiment of our invention, comprising a main frame 4 carried by main wheels 5, on an axle 6 rotatable with said wheels, and a swivel-wheel 7 mounted in the forward end of the frame.

The main frame 4, on each side bar thereof, carries a dependent bracket 8 supporting a transverse shaft 9 serving as a pivotal support for two forwardly directed arms 10 secured to a transverse bar 11 which carries two forwardly directed yokes 12 bearing, each, a shaft 13 serving as an axle for a roller 14, said rollers being spaced apart a sufficient distance to insure their rolling over two adjacent rows of beet plants. The main frame 4 carries a bearing 15 for a pivot 16 of a lever 17, the rear end of which is adapted to be locked in any one of a plurality of vertical positions, and the forward end of which is in operative connection, by means of a link 18, with the transverse bar 11, a coil spring 19 normally holding said bar in lowermost position, and it will be seen that, by depressing the rear end of said lever, the rollers 14 may be raised clear of the ground and locked in such position. Also carried by the transverse bar 11, at each end thereof, is a cutter 20, shown as a plow share, and preferably provided with a mold-board 21, one of these cutters being under each roller 14, and the mold-boards being curved outwardly of the machine in order to carry the beet plants cut by the cutters away from the machine, preferably to a point centrally of the space between a row being harvested and the adjacent row not being harvested. Also pivotally supported by the shaft 9 are rearwardly directed arms 22 forming a supplemental frame 23 adapted to be raised or lowered by means of a cable 24 secured thereto and led upwardly over a pulley 25, beneath a guide sheave 26, and to a drum 27 rotatable on the shaft or axle 6, said drum having one member 28 of a clutch secured thereto; keyed on said axle is the complemental clutch member 29 slidable toward or from the member 28, or the clutch member 29 may be immovable on the axle and the drum 27 slidable and rotatable on the axle as illustrated, a lever 30 being provided for throwing the clutch members into or out of engagement. In the forward movement of the harvester the axle is rotated by the wheels and, if the clutch members 28 and 29 be now connected, the cable is wound on the drum and the supplemental frame 23 is raised from the horizontal position shown, the cable being in frictional engagement with the drum.

The supplemental frame 23 carries a vertically arranged standard 31, preferably adjustable, which in turn carries a beet digger at its lower end formed of rearward, outwardly, and upwardly, inclined blades 32 which are pulled through the earth slightly beneath the beets and serve to loosen said beets or the roots thereof from the earth. Adjustably secured on the standard 31 is an arm 33 which carries a cross bar 33ª in turn carrying two sets of forwardly and downwardly inclined, pointed, rods 34 which are preferably arranged in two sets, one behind each roller, and may be collectively centrally and downwardly bellied in order to cause the beets gathered by said rods 34, actually a rake, to gather in the middle of the respective rake, the beets successively raked forcing those already raked backwardly and upwardly toward the rear of the respective rakes.

Keyed to the axle 6 is a sprocket-wheel 35 for an endless chain 36 also passed around a sprocket-wheel 37 on a shaft 38 carried in suitable bearings in the rear end of the supplemental frame 23, and this shaft carries two rollers 39 secured thereto and rotatable therewith; passed around each roller 39 is an endless band 40 also passed around the respective one of two rollers 41, the latter rollers being in close proximity to the respective rake formed by the rods 34, and an inclined table is arranged beneath each band 40 in line with the respective rake. As the machine moves forward, the bands 40 are moved to carry the beets upwardly into a hopper or box 42, spikes 43 being provided on the bands to insure this result, and we may slope the floor of said box downwardly toward its center and provide an opening 44 in the bottom thereof, whereby the beets will be dropped in a line upon the surface of the earth beneath each box or, preferably, in line with the center of the machine and centrally between the rows of plants now harvested.

Each roller 41 is carried in a yoke 46 in turn carried by a rod 47 slidably arranged in a guide-block 48 whereby the roller 41 over each rake may yield upwardly for the larger beets and still engage the smaller sizes, a spring 49 being provided to maintain the roller 41 in lowermost position adjacent the respective rake. We may also, although not illustrated, provide a carrier and elevator for transferring the beets from the box 42 to a wagon instead of dropping them on the ground as described.

Our harvester, as will be seen from the foregoing, tops the beets, loosens the roots from the earth, removes the beets from the earth to a suitable receptacle, deposits the beets on a line between two harvested rows, and deposits the plant tops on lines between the harvested and adjacent unharvested rows; the topping mechanism may be raised out of the way when desired, as may also the loosening and raking means, and the means for transferring the beets from the rakes to the box 42 are automatically adjustable to accommodate the same to different sizes of beets.

Our invention is very simple, though highly efficient, and we reserve the right to make changes over the form shown and described, within the scope of the following claims, which do not depart from the spirit of our invention nor sacrifice its advantages.

Having fully described our invention, what we claim as new, and desire to secure by Letters Patent, is:—

1. In a harvester, a frame, a standard carried by said frame, beet digging blades at the lower end of said standard, one at each side thereof, and a beet gathering rake arranged at the rear of each of the said blades.

2. In a harvester, a frame, a standard at the longitudinal center of said frame, two rearwardly, outwardly and upwardly inclined beet digging blades carried by said standard, one at each side thereof, and a beet gathering rake arranged at the rear of each of the said blades.

3. In a harvester, a frame, a standard carried by said frame, beet digging blades at the lower end of said standard, one at each side thereof, a cross bar vertically adjustable on said standard, and a set of forwardly and downwardly inclined rakes at each end of said cross bar and in rear of a digging blade.

4. In a harvester, a wheel supported frame, a supplemental frame carried by the wheel supported frame, a standard at the longitudinal center of the supplemental frame, digging blades at the lower end of the standard on opposite sides thereof, rakes carried by the standard, one in rear of each of the said blades, the teeth of the rakes inclining forwardly and downwardly, a forwardly and downwardly inclined table having its lower end adjacent the upper ends of the teeth of the rakes, endless belts above the table, one in rear of each rake, and means for operating the belts from the axle of the supporting wheels.

5. In a beet harvester a wheel supported frame, a supplemental frame carried by the wheel supported frame, a standard carried by the supplemental frame, digging blades at the lower end of the standard, one at each side thereof and each adapted to dig the beets of a row, two rakes one in the rear of each blade, the teeth of the rakes inclining downwardly and forwardly, means in rear of the rakes for receiving the beets therefrom and conveying them away, and means for operating the conveying means from the axle of the supporting wheels.

6. In a harvester, a frame, a standard at the longitudinal center of the frame, a rearwardly inclined blade at each side of the lower end of the standard, a downwardly and rearwardly extending arm carried by the standard having a cross bar at its end, and two rakes carried by the cross bar, one at each end thereof, the teeth of the rakes being inclined and projecting above and below the cross bar.

7. In a harvester, a frame, a standard at the longitudinal center of the frame, a rearwardly outwardly and upwardly inclined blade at the lower end of the standard, an arm adjustably mounted on the standard and carrying a cross bar at its end, and two sets of downwardly and forwardly inclined teeth carried by said bar, one at each end thereof and in rear of a blade, the teeth projecting below and above the cross bar, the teeth of each set forming a rake being concave in cross section.

In testimony whereof we have signed our names to this specification in the presence of two subscribing witnesses.

CLARENCE J. HOBSON.
GEORGE PAGE WRIGHT.

Witnesses:
CHAS. L. SMITH,
R. A. McCOMBS.